March 4, 1930.  L. A. POUJAUD  1,749,647
ASPHALT ROLLER
Filed Aug. 30, 1929
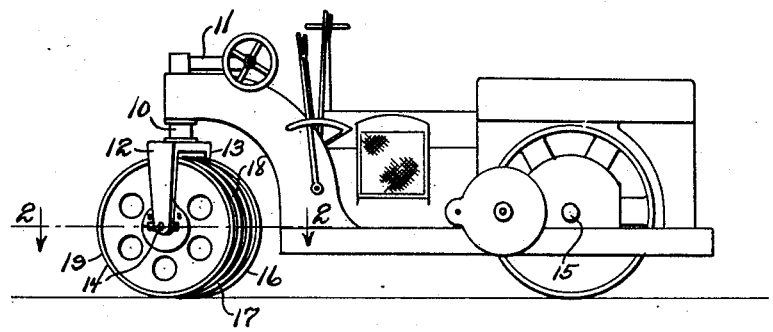
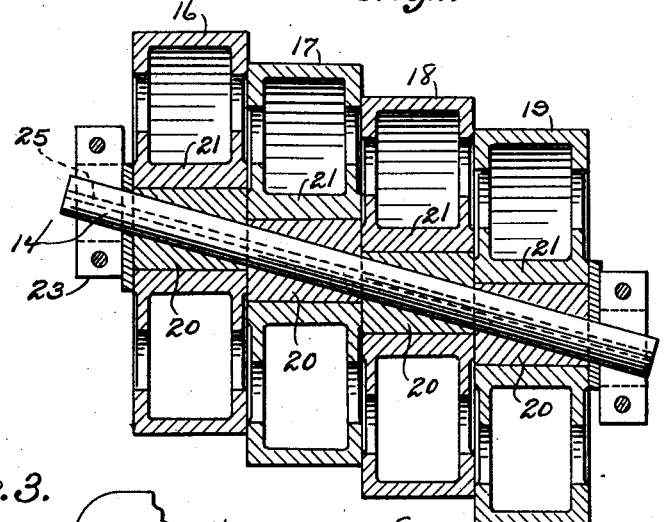
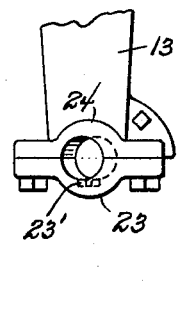
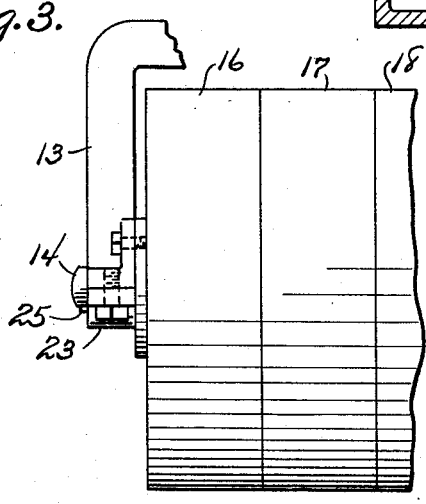
INVENTOR.
Leon A. Poujaud
BY Victor J. Evans
ATTORNEY.

Patented Mar. 4, 1930

1,749,647

UNITED STATES PATENT OFFICE

LEON A. POUJAUD, OF ATLANTA, GEORGIA

ASPHALT ROLLER

Application filed August 30, 1929. Serial No. 389,522.

The object of this invention is to provide a machine in which the forward roller comprises a plurality of elements mounted in a particular manner, so that the machine may be operated in the usual manner and yet the uneven places, ridges or ripples usually resulting, will be eliminated.

A further object is to provide the forward roller of such a machine with an axle or shaft mounted at an angle of some fifteen or twenty degrees with reference to the rear axle, the independent rollers carried by the forward axle being in offset relation, and having bearing elements provided with bores arranged at an angle, so that the rollers will be in parallel relation with reference to the path of travel of the machine, the forward axle being inclined and the tendency to produce rough places or ripples being obviated.

A further object is to produce a particular front fork for mounting elements of the forward roller in order to produce the effect referred to.

With the foregoing and other objects in view, the invention consists in the novel construction and arrangement of elements disclosed, it being understood that modifications may be made within the scope of the claims without departing from the spirit of the invention.

In the drawings forming part of this application:—

Figure 1 is a view of the machine in side elevation.

Figure 2 is a view in horizontal section on line 2—2 of Figure 1, and thru the elements of the forward roller.

Figure 3 is a fragmentary view in elevation showing a portion of the fork and the bearing of the axle therein.

Figure 4 is a fragmentary view of one of the side elements of the fork and showing the inclination of the bore provided by the box.

Figure 5 is a detail in perspective showing the manner of keying the forward axle.

In Figure 1 the machine is shown conventionally, so far as those portions not including the forward roller are concerned, and the fork for said forward roller includes the central stem 10 carrying a guiding element 11, and the fork further includes the side downwardly extending members 12 and 13. The boxes carried by these elements 12 and 13 are of the character shown in the detail views, and the bore for the front axle 14, is at an angle as shown especially in Figure 4, so that this axle 14 may be at an angle of some fifteen or twenty degrees with reference to the rear axle 15, when the machine is traveling directly forward under usual rolling conditions.

In order to avoid the necessity of transverse rolling for eliminating rough places, ripples or the like, I provide the special arrangement shown in Figure 2 and elsewhere, the individual elements 16, 17, 18 and 19 of the forward roller being in offset relation, and each being provided with a sleeve or the like 20 mounted within hub portion 21 and adapted to receive axle 14 in the position shown.

In view of this arrangement the tread portions of the elements 16, 17, 18 and 19 will travel at an angle with reference to the forward path of travel of the machine, and the aforesaid rough places will be wholly avoided in a simple rolling operation, without the necessity of employing the machine for direct rolling in a direction transversely of the roadway.

The treads engage the paving in the same horizontal plane, and the active portions of the treads, as a series, correspond in direction with the axis of shaft 14. The lower cap plates 23 of the bearings 24 have keyways 23' for keys 25.

What I claim is:—

1. In a machine of the class described, a front axle normally deflected with reference to a plane perpendicular to the normal path of the machine, mounting means for the axle, a plurality of rollers, and sleeves having deflected bores and mounting the rollers on said axle with the sides of the rollers in parallel relation, the axes of rotation of the rollers being perpendicular to the normal path of travel of the machine.

2. In a machine of the class described, a front axle normally deflected with reference to a plane perpendicular to the normal path of the machine, mounting means for the axle, guiding means connected with the mounting means, said guiding means when the machine is traveling in a straight path being deflected at less than a right angle with reference to the axle, a plurality of rollers, and sleeves having deflected bores and mounting the rollers on said axle with the sides of the rollers in parallel relation, the axes of rotation of the rollers being perpendicular to the normal path of travel of the machine.

3. In a machine of the class described, a front fork comprising side portions normally out of transverse alignment and including bearings providing aligned bores deflected with reference to a plane perpendicular to the normal path of the machine, an axle mounted in the bearings, and rollers mounted on said axle and having their axes of rotation perpendicular to said path.

LEON A. POUJAUD.